United States Patent [19]

Chwastiak

[11] 4,209,500
[45] Jun. 24, 1980

[54] LOW MOLECULAR WEIGHT MESOPHASE PITCH

[75] Inventor: Stephen Chwastiak, Middleburg Heights, Ohio

[73] Assignee: Union Carbide Corporation, New York, N.Y.

[21] Appl. No.: 838,963

[22] Filed: Oct. 3, 1977

[51] Int. Cl.² ........................... D01F 9/14; C10C 3/00
[52] U.S. Cl. ..................... 423/447.6; 208/22; 208/44; 264/29.2; 423/447.2; 423/449
[58] Field of Search ............... 423/447.6, 447.1, 445, 423/449, 447.2, 447.4; 264/29.2; 208/22, 39, 44; 106/273 R

[56] References Cited

U.S. PATENT DOCUMENTS

| | | | |
|---|---|---|---|
| 3,787,541 | 1/1974 | Grindstaff et al. | 264/29.2 |
| 3,974,264 | 8/1976 | McHenry | 423/447.4 |
| 3,976,729 | 8/1976 | Lewis et al. | 427/447.8 X |
| 3,995,014 | 11/1976 | Lewis | 423/447.4 |
| 4,005,183 | 1/1977 | Singer | 423/447.2 |
| 4,016,247 | 4/1977 | Otani et al. | 423/447.4 |
| 4,055,583 | 10/1977 | Kolling et al. | 423/447.4 |

FOREIGN PATENT DOCUMENTS 2015175  12/1970  Fed. Rep. of Germany ........ 423/447.1

OTHER PUBLICATIONS

Otani et al., "Softening Point and Viscosity of Pitches Containing Mesophase", Tanso, No. 87, pp. 135–137, 1976.

*Primary Examiner*—Edward J. Meros
*Attorney, Agent, or Firm*—David Fink

[57] ABSTRACT

A low molecular weight, anisotropic pitch consisting of essentially 100 percent mesophase and suitable for spinning into continuous filaments can be prepared by passing an inert gas through an isotropic carbonaceous pitch at a rate of at least 4.0 scfh. per pound of pitch while heating the pitch at a temperature of from about 380° C. to about 430° C. to produce mesophase and simultaneously agitating the pitch so as to produce a homogeneous emulsion of the mesophase produced and the remaining non-mesophase portion of the pitch, said heating and agitation being continued until the pitch has been essentially completely converted to mesophase and the emulsion has been transformed into an essentially single phase system. When examined under polarized light, the pitches of the present invention are seen to consist of a single phase which is essentially completely anisotropic. The fibers spun from such pitch are also essentially completely anisotropic and can be further processed to produce carbon and graphite fibers having a high Young's modulus of elasticity and high tensile strength.

8 Claims, No Drawings

LOW MOLECULAR WEIGHT MESOPHASE PITCH

BACKGROUND OF THE INVENTION

This invention relates to a low molecular weight, anisotropic pitch consisting of essentially 100 percent mesophase which can be easily and continuously spun to produce essentially completely anisotropic fibers, which fibers can be further processed to produce carbon and graphite fibers having a high Young's modulus of elasticity and high tensile strength.

As a result of the rapidly expanding growth of the aircraft, space and missile industries in recent years, a need was created for materials exhibiting a unique and extraordinary combination of physical properties. Thus, materials characterized by high strength and stiffness, and at the same time of light weight, were required for use in such applications as the fabrication of aircraft structures, re-entry vehicles, and space vehicles, as well as in the preparation of marine deep-submergence pressure vessels and like structures. Existing technology was incapable of supplying such materials and the search to satisfy this need centered about the fabrication of composite articles.

One of the most promising materials suggested for use in composite form was high strength, high modulus carbon textiles, which were introduced into the market place at the very time this rapid growth in the aircraft, space and missile industries was occurring. Such textiles have been incorporated into both plastic and metal matrices to produce composites having extraordinary high-strength- and high-modulus-to-weight ratios and other exceptional properties. However, the high cost of producing the high-strength, high-modulus carbon textiles employed in such composites has been a major deterrent to their widespread use, in spite of the remarkable properties exhibited by such composites.

One recently proposed method of producing high-modulus, high-strength carbon fibers at low cost is described in U.S. Pat. No. 4,005,183, entitled "High Modulus, High Strength Carbon Fibers Produced From Mesophase Pitch". Such method comprises first spinning a carbonaceous fiber from a carbonaceous pitch having a liquid crystal or mesophase content of from about 40 percent by weight to about 90 percent by weight, then thermosetting the fiber so produced by heating the fiber in an oxygen-containing atmosphere for a time sufficient to render it infusible, and finally carbonizing the thermoset fiber by heating in an inert atmosphere to a temperature sufficiently elevated to remove hydrogen and other volatiles and produce a substantially all-carbon fiber. As indicated in said patent, the highly oriented, optically anisotropic, liquid crystal material produced by heating a carbonaceous pitch at a temperature above about 350° C. has been given the term "mesophase", and pitches containing such material are known as "mesophase pitches". As further indicated in said patent, pitches having a mesophase content of more than about 90 percent are generally not employed in the process described herein because the characteristically high molecular weight of such pitches imparts softening temperatures and viscosities to them which are so high as to make them unsuitable for spinning. Thus, such pitches can only be softened to suitable spinning viscosities at temperatures in excess of 400° C., at which temperatures they continue to polymerize to form still higher molecular weight products, rendering the spinning operation impractical.

An improved process for producing carbon fibers from mesophase pitch is disclosed in U.S. Pat. Nos. 3,976,729 and 4,017,327. According to said patents, fibers are produced from a mesophase pitch wherein the mesophase content of the pitch has been formed while agitating the pitch so as to produce a homogeneous emulsion of the immiscible mesophase and non-mesophase portions of the pitch. Mesophase pitches prepared in this manner have been found to possess a lesser amount of high molecular weight molecules in the mesophase portion of the pitch and a lesser amount of low molecular weight molecules in the non-mesophase portion of the pitch, and thus a smaller differential between the average molecular weights of the mesophase and non-mesophase portions of the pitch, then mesophase pitches having the same mesophase content which have been prepared in the absence of such agitation. Although such pitches are more suitable for spinning into fibers than pitches produced in the absence of agitation, they are still two phase systems which, in their liquid state, consist of two immiscible liquids, one the optically anisotropic, oriented mesophase, and the other the lower viscosity, isotropic, non-mesophase. While the presence of the isotropic phase was heretofore considered necessary to plasticize the higher viscosity mesophase and impart thereto flow properties conducive to the spinning of small diameter fibers, the tendency of these two phase pitches to segregate into their component phases continued to hamper spinning operations.

As further disclosed in U.S. Pat. Nos. 3,974,264 and 4,026,788, pitch of a given mesophase content can be produced in substantially shorter periods of time than previously possible, at a given temperature, by passing an inert gas through the pitch during formation of the mesophase at a rate of at least 0.5 scfh. per pound of pitch. In addition to shortening the time required to produce a pitch of a given mesophase content by lessening the amount of low molecular weight molecules in the non-mesophase portion of the pitch which do not form mesophase, or do not form mesophase at a rapid rate, this procedure results in a more easily spinnable pitch by removing those molecules which adversely affect the rheology and spinnability of the pitch. Again, however, the pitches produced in this manner are two phase systems which have less than optimum spinning characteristics because of their tendency to segregate into their component phases.

SUMMARY OF THE INVENTION

In accordance with the present invention, it has now been discovered that a low molecular weight, anisotropic pitch consisting of essentially 100 percent mesophase and suitable for spinning into continuous filaments can be prepared by passing an inert gas through an isotropic carbonaceous pitch at a rate of at least 4.0 scfh. per pound of pitch while heating the pitch at a temperature of from about 380° C. to about 430° C. to produce mesophase and simultaneously agitating the pitch so as to produce a homogeneous emulsion of the mesophase produced and the remaining non-mesophase portion of the pitch, said heating and agitation being continued until the pitch has been essentially completely converted to mesophase and the emulsion has been transformed into an essentially single phase system. When examined under polarized light, the pitches of the present invention are seen to consist of a single phase which is essentially completely anisotropic. The fibers spun from such pitch are also essentially completely anisotropic and can be further processed to produce carbon and graphite fibers having a high Young's modulus of elasticity and high tensile strength.

DESCRIPTION OF THE PREFERRED EMBODIMENTS

The essentially 100 percent mesophase pitches of the present invention are characterized by a number average molecular weight below 1000, a net pyridine insoluble content no greater than 60 percent by weight, a softening temperature no greater than 350° C., and a viscosity no greater than 200 poises at 380° C. Usually these pitches have a number average molecular weight of from about 800 to about 900, a net pyridine insoluble content of from 50 percent by weight to 60 percent by weight, a softening temperature of from 330° C. to 350° C., and a viscosity of from about 50 poises to about 150 poises at 380° C. Characteristically, more than 50 percent of the molecules in such pitches have a molecular weight of less than 800 and no more than 10 percent of the molecules in such pitches have a molecular weight in excess of 1500. Because the anisotropic pitches of the present invention contain a high percentage of highly compatible low molecular weight molecules, they exist as a single phase, are characterized by excellent rheological properties, and can be easily spun into continuous fibers of small and uniform diameter.

Conventional molecular weight analysis techniques can be employed to determine the molecular weight characteristics of the essentially 100 percent mesophase pitches of the present invention. One means which has been employed to determine the number average molecular weight of the mesophase pitches produced in accordance with the present invention involves the use of a vapor phase osmometer. The utilization of instruments of this type of molecular weight determinations has been described by A. P. Brady et al. (Brady, A. P., Huff, H., and McGain, J. W., J. Phys. & Coll. Chem., Vol. 55, 304, (1951)). The osmometer measures the difference in electrical resistance between a sensitive reference thermistor in contact with a pure solvent, and a second thermistor in contact with a solution of said solvent having dissolved therein a known concentration of a material whose molecular weight is to be determined. The difference in electrical resistance between the two thermistors is caused by a difference in temperature between the thermistors which is produced by the different vapor pressures of the solvent and the solution. By comparing this value with the difference in resistance obtained with said solvent and standard solutions of said solvent containing known concentrations of compounds of known molecular weights, it is possible to calculate the molecular weight of the solute material. A drop of pure solvent and a drop of a solution of said solvent having dissolved therein a known concentration of the material whose molecular weight is being determined are suspended side by side on a reference thermistor and sample thermistor, respectively, contained in a closed thermostated chamber saturated with solvent vapor, and the resistance of the two thermistors is measured and the difference between the two recorded. Since a solution of a given solvent will always have a lower vapor pressure than the pure solvent, a differential mass transfer occurs between the two drops and the solvent vapor phase, resulting in greater overall condensation on (and less evaporation form) the solution drop than on the solvent drop. This difference in mass transfer causes a temporary temperature difference between the two thermistors (due to differences in loss of heat of vaporization between the two drops) which is proportional to the difference in vapor pressure between the two drops. Since the difference in vapor pressure between the two drops, and hence the difference in temperature and resistance, ($\Delta R$), between the two thermistors depends solely upon the number of molecules of the solute material dissolved in the solvent, and is independent of the chemical composition of the molecules, the mole fraction of solute in the solution, (N), can be determined from a plot of $\Delta R$ vs. N for such solvent and solutions of such solvent containing known concentrations of compounds of known molecular weight.[1] $\Delta R$ and N bear a direct linear relationship to each other, and from a determination of N it is possible to calculate the calibration constant, (K), for the solvent employed from the formula:

$$K = \Delta R / N$$

Having determined the value of K, the molecular weight of the material may be determined from the formula:

$$M_x = (K - \Delta R)(M_y \cdot W_x)/(\Delta R \cdot W_y)$$

wherein $M_x$ is the molecular weight of the material upon which the determination is being made, K is the calibration constant for the solvent employed, $\Delta R$ is the difference in resistance between the two thermistors, $M_y$ is the molecular weight of the solvent, $W_y$ is the weight of the solvent, and $W_x$ is the weight of the material whose molecular weight is being determined. Of course, having once determined the value of the calibration constant of a given solvent, (K), the molecular weight of a given material may be determined directly from the formula.

[1] By the mole fraction of a given material in a solution, (N), is meant the number of moles of such material in the solution divided by the number of moles of such material in the solution plus the number of moles of the solvent.

While the molecular weight of the soluble portion of the pitch can be determined directly on a solution thereof, in order to determine the molecular weight of the insoluble portion, it is necessary that it first be solubilized, e.g., by chemical reduction of the aromatic bonds of such material with hydrogren.[2] A suitable means for solubilizing coals and carbons by reduction of the aromatic bonds of these materials has been described by J. D. Brooks et al. (Brooks, J. D., and Silberman, H., "The Chemical Reduction of Some Cokes and Chars", Fuel, Vol. 41, pp. 67–69, 1962). This method involves the use of hydrogen generated by the reaction of lithium with ethylenediamine, and has been found to effectively reduce the aromatic bonds of carbonaceous materials without rupturing carbon-carbon bonds. Such method has been suitably employed to solubilize the insoluble portion of the pitches prepared in accordance with the invention.

[2] The soluble portion of the pitch may be readily separated from the insoluble portion by Soxhlet extraction in boiling pyridine (115° C.).

Another means which has been employed to determine the molecular weight characteristics of the essentially 100 percent mesophase pitches of the present invention is gel permeation chromatography (GPC). This technique has been described by L. R. Snyder (Snyder, L. R., "Determination of Asphalt Molecular Weight Distributions by Gel Permeation Chromatography", Anal. Chem., Vol. 41, pp. 1223–1227, 1969). A gel permeation chromatograph is employed to fractionate a solution of polymer or polymer related molecules of various sizes, and the molecular weight distribution of the sample is determined with the aid of a detection system which is linearly responsive to solute concentration, such as a differential refractometer or a differential ultraviolet absorption spectrometer. As in the case of the vapor phase osmometry technique, while the molecular weight of the soluble portion of the pitch can be determined directly on a solution thereof, in order to determine the molecular weight of the insoluble portion, it is necessary that it first be solubilized.

Fractionation of the sample whose molecular weight distribution is being determined is effected by dissolving the sample in a suitable solvent and passing the solution through the chromatograph and collecting measured fractions of the solution which elute through the separation column of the chromatograph. A given volume of solvent is required to pass molecules of a given molecular size through the chromatograph, so that each fraction of solution which elutes from the chromatograph contains molecules of a given molecular size. The fractions which flow through the column first contain the higher molecular weight molecules, while the fractions which take the longest time to elute through the column contain the lower molecular weight molecules.

After the sample has been fractionated, the concentration of solute in each fraction is determined by means of a suitable detection system, such as a differential refractometer or a differential ultraviolet absorption spectrometer. When a differential refractometer is employed, the refractive index of each fraction is automatically compared to that of the pure solvent by means of two photoelectric cells which are sensitive to the intensity of light passing through such fractions and solvent, and the differences in signal intensities between the two cells are automatically plotted against the cumulative elution volume of the solution. Since the magnitude of these differences in signal intensity is linearly related to the concentration by weight of solute molecules present, the relative concentration by weight of molecules in each fraction can be determined by dividing the differential signal intensity for that fraction by the total integrated differential signal intensity of all the fractions. This relative concentration may be graphically depicted by a plot of the differential signal intensity for each fraction against the cumulative elution volume of the sample.

The molecular weight of the molecules in each fraction can then be determined by standard techniques, e.g., by the osmometry techniques described above. Since most pitches are composed of similar types of molecular species, once the molecular weights of the various fractions of a particular sample have been determined, that sample may be used as a standard and the molecular weights of the fractions of subsequent samples can be determined from the known molecular weights of like fractions of the standard. Thus, molecular weight determinations need not be repeatedly made on each fraction of each sample, but may be obtained from the molecular weights determined for like fractions of the standard. For convenience, a molecular weight distribution curve depicting the relationship of the molecular weight to the elution volume of the standard may be prepared by plotting the molecular weights determined for the standard fractions against the cumulative elution volume of the standard. The molecular weights of the molecules of the various chromatographic fractions of any given sample can then be directly read from this curve. As aforementioned, the relative concentration by weight of solute molecules in each fraction can be determined by differential refractive index measurements.

To facilitate the molecular weight determinations, the differential signal intensities and elution volume values obtained on a given sample, together with previously determined molecular weight data relating to the various chromatographic fractions of a standard pitch, can be processed by a computer and transcribed into a complete molecular weight distribution analysis. By this procedure, complete printouts are routinely provided of number average molecular weight ($M_n$), weight average molecular weight ($M_w$), molecular weight distribution parameter ($M_w/M_n$), as well as a compilation of molecular weight and percentage by weight of solute present in each chromatographic fraction of a sample.

Although the anisotropic pitches of the present invention consist of essentially 100 percent mesophase, as determined by examination of such pitches under polarized light, such pitches have been found to have a net pyridine insoluble content of no greater than 60 percent by weight. On the other hand, essentially 100 percent mesophase pitches produced in accordance with conventional techniques, i.e., in the absence of agitation and an inert gas purge as described herein, are essentially completely insoluble in pyridine. The increased solubility of mesophase produced in accordance with the present invention is believed to be the result of the lower molecular weight of such mesophase. This increased solubility is quite surprising because heretofore it was believed that mesophase was essentially completely insoluble in all organic solvents.

The percent of pyridine insolubles (P.I.) is determined by Soxhlet extraction in boiling pyridine (115° C.). At times, a small amount of the total pyridine insolubles of the pitch may be due to the presence of infusible non-mesophase insolubles (either present in the original pitch or developed by heating). The total pyridine insoluble content of the pitch less the pyridine insoluble content due to the presence of infusible non-mesophase insolubles represents the net pyridine insoluble content of the pitch. The presence or absence of such infusible non-mesophase insolubles can be visually observed by polarized light microscopy examination of the pitch (see, e.g., Brooks, J. D., and Taylor, G. H., "The Formation of Some Graphitizing Carbons," *Chemistry and Physics of Carbon*, Vol. 4, Marcel Dekker, Inc., New York, 1968, pp. 243–268; and Dubois, J., Agache, C., and White, J. L., "The Carbonaceous Mesophase Formed in the Pyrolysis of Graphitizable Organic Materials," Metallography, Vol. 3, pp. 367–369, 1970). The amount of this material may also be visually estimated in this manner. The insoluble content of the untreated pitch is generally less than 1 percent (except for certain coal tar pitches) and consists largely of coke and carbon black found in the original pitch.

In addition to a higher solubility in pyridine, the essentially 100 percent mesophase pitches of the present invention have a lower softening temperature and viscosity than conventional high mesophase content mesophase pitches, e.g., those conventional mesophase pitches containing in excess of about 90 percent mesophase. Thus, the essentially 100 percent mesophase pitches produced in accordance with the present invention have been found to soften at temperatures no greater than 350° C. and to exhibit a viscosity no greater than 200 poises at 380° C. As a result, such pitches can be spun into fibers at much lower temperatures (e.g. 340° C.–380° C.) than conventional high mesophase content mesophase pitches. The lower the spinning temperature, of course, the lower the polmerization rate of the pitch, and the less the pitch will polymerize during spinning and obstruct the formation of fibers. Within the aforementioned temperature range (340° C.–380° C.), the polymerization rate is quite negligible and no serious interference with spinning of the pitch occurs. Above such temperatures, however, the polymerization rate increases dramatically and spinning is severely hampered by such polymerization.

In addition to their lowered softening temperatures and viscosities, the essentially 100 percent mesophase pitches of the present invention exhibit less thixotrophy than conventional two phase systems. As a result, such pitches may be quite easily spun into fibers.

As aforementioned, the essentially 100 percent mesophase pitches of the present invention can be prepared by passing an inert gas through an isotropic carbonaceous pitch at a rate of at least 4.0 scfh. per pound of pitch while heating the pitch at a temperature of from about 380° C. to about 430° C. to produce mesophase and simultaneously agitating the pitch so as to produce a homogeneous emulsion of the mesophase produced and the remaining non-mesophase portion of the pitch, said heating and agitation being continued until the pitch has been essentially completely converted to mesophase and the emulsion has been transformed into an essentially single phase system. Any inert gas which does not react with the pitch under the heating conditions employed can be employed. Illustrative of such gases are nitrogen, argon, xenon, helium, steam and the like.

Heating of the pitch is effected at a temperature of from about 380° C. to about 430° C. and is continued, together with the inert gas flow and agitation, until the pitch has been essentially completely converted to mesophase and transformed into an essentially single phase system. The time required to convert a given pitch to essentially 100 percent mesophase at a given inert gas flow rate depends upon the temperature employed. This time may be determined empirically by sampling the pitch at various times and examining the samples under polarized light to ascertain when conversion of the pitch to mesophase is complete. Generally, from about 2 hours to about 60 hours, usually from about 5 hours to about 44 hours, are required to completely convert the pitch to mesophase and produce a single phase system.

In order to ensure essentially complete removal of the volatile low molecular weight components of the pitch which do not form mesophase or do not form mesophase at a rate sufficiently rapid to allow the formation of the essentially 100 percent mesophase pitches of the present invention, the inert gas should be passed through the pitch at a rate of at least 4.0 scfh. per pound of pitch. These low molecular weight components include both those low molecular weight compounds initially present and certain low molecular weight polymerization by-products. Generally, the higher the temperature employed during conversion of the pitch to mesophase, the faster the pitch will be converted to mesophase and the faster the flow rate of gas must be to ensure removal of the low molecular weight components at a rate sufficiently rapid to allow formation of the essentially 100 percent mesophase pitches of the present invention. Thus, e.g., at a temperature of about 430° C. where the pitch is converted to mesophase relatively rapidly, a very high gas flow rate is required, whereas at 380° C. where the pitch is converted to mesophase much more slowly, a much lower gas flow rate will accomplish the same result. Generally, a gas flow rate of from 4.0 scfh. to 10.0 scfh. per pound of pitch is necessary to affect removal of the low molecular weight molecules present at a satisfactory rate under the temperature conditions employed in the present invention.

In order to estimate the rate at which the inert gas must be passed through the starting pitch at a given temperature to convert said pitch to an essentially 100 percent mesophase pitch of the present invention, it is necessary to determine the so-called sparging constant ($K_{Sp}$) of the pitch. This constant may be determined by measuring the vapor pressure of the starting pitch at a given temperature, and then multiplying this value by the total volume of inert gas required to convert the pitch to an essentially 100 percent mesophase pitch of the present invention at that temperature. The total volume of gas required is determined by multiplying the flow rate of gas through the pitch by the shortest time required at the temperature employed to convert the pitch to an essentially 100 percent mesophase pitch of the present invention. The flow rate employed in determining the sparging constant ($K_{Sp}$) of the pitch is arbitrarily selected and the shortest time required to convert the pitch to essentially 100 percent mesophase is determined empirically, as aforesaid, by sampling the pitch at various times and examining the samples under polarized light to ascertain when conversion of the pitch to mesophase is complete. If desired, the vapor pressure of the pitch may be estimated from the vapor pressure of a model compound having a molecular weight corresponding to the average molecular weight of the pitch volatiles rather than determining the vapor pressure directly on the pitch itself.

Knowing the vapor pressure of the starting pitch at a given temperature, the flow rate of gas employed, and the time required to convert said pitch to an essentially 100 percent mesophase pitch of the present invention at said temperature and flow rate, the sparging constant ($K_{Sp}$) of the pitch can then be readily calculated from the formula:

$$K_{Sp} = t \times F.R. \times V.P.$$

wherein $K_{Sp}$ = the sparging constant of the pitch t = the shortest time in hours required to convert the pitch to essentially 100 percent mesophase at the temperature employed F.R. = the rate at which the inert gas is passed through the pitch at the temperature employed in standard cubic feet per hour (scfh.) per pound of pitch, and V.P. = the vapor pressure of the pitch at the temperature employed (atmospheres)

Having once determined the sparging constant ($K_{Sp}$) of a particular pitch, the rate at which the inert gas must be passed through the pitch at any other given temperature to convert the pitch to an essentially 100 percent mesophase pitch of the present invention can be readily estimated from the above formula. The vapor pressure of the starting pitch at the temperature employed can be either measured directly or estimated from the vapor pressure of a model compound having a molecular weight corresponding to the average molecular weight of the pitch volatiles as aforesaid. The time required to convert the pitch to an essentially 100 percent mesophase pitch of the present invention can also be estimated by heating a small sample of the pitch in a shallow boat, such heating in a shallow boat being considered the equivalent of sparging with a high flow rate of gas. Knowing these values, the flow rate of gas, the only remaining unknown, can then be estimated from the formula.

Aromatic base carbonaceous pitches having a carbon content of from about 92 percent by weight to about 96 percent by weight and a hydrogen content of from about 4 percent by weight to about 8 percent by weight are generally suitable for producing the essentially 100 percent mesophase pitches of the present invention. Elements other than carbon and hydrogen, such as oxygen, sulfur and nitrogen, are undesirable and should not be present in excess of about 4 percent by weight. The presence of more than such amount of extraneous elements may disrupt the formation of carbon crystallites during subsequent heat treatment and prevent the development of a graphitic-like structure within the fibers produced from these materials. In addition, the presence of extraneous elements reduces the carbon content of the pitch and hence the ultimate yield of carbon fiber. When such extraneous elements are present in amounts of from about 0.5 percent by weight to about 4 percent by weight, the pitches generally have a carbon content of from about 92–95 percent by weight, the balance being hydrogen.

Petroleum pitch, coal tar pitch and acenapthylene pitch, which are well-graphitizing pitches, are preferred starting materials for producing the essentially 100 percent mesophase pitches of the present invention. Petroleum pitch, of course, is the residuum carbonaceous material obtained from the distillation of crude oils or the catalytic cracking of petroleum distillates. Coal tar pitch is similar obtained by the distillation of coal. Both of these materials are commercially available natural pitches in which mesophase can easily be produced, and are preferred for this reason. Acenaphthylene pitch, on the other hand, is a synthetic pitch which is preferred because of its ability to produce excellent fibers. Acenaphthylene pitch can be produced by the pyrolysis of polymers of acenaphthylene as described by Edstrom et al. in U.S. Pat. No. 3,574,653.

As the pitch is heated at a temperature between 380° C. and 430° C. to produce mesophase, the pitch will, of course, pyrolyze to a certain extent and the composition of the pitch will be altered, depending upon the temperature, the heating time, and the composition and structure of the starting material. Generally, however, after heating a carbonaceous pitch for a time sufficient to produce essentially 100 percent mesophase under the conditions of the present invention, the resulting pitch will contain a carbon content of from about 94–96 percent by weight and a hydrogen content of from about 4–6 percent by weight. When such pitches contain elements other than carbon and hydrogen in amounts of from about 0.5 percent by weight to about 4 percent by weight, the mesophase pitch will generally have a carbon content of from about 92–95 percent by weight, the balance being hydrogen.

The degree to which the pitch has been converted to mesophase can readily be determined by polarized light microscopy. A sample of the pitch is heated in an inert atmosphere to a temperature sufficiently elevated to cause it to melt, and the molten pitch is annealed at a temperature of 350° C. for one-half hour. In pitches containing in excess of 70 percent mesophase, the annealing procedure causes any isotropic phase to segregate from the anisotropic phase. A cross-section of the cooled annealed pitch sample is then encapsulated in an epoxy resin and examined under polarized light using cross polarizers (after fine grinding the samples on silicon carbide laps and then polishing them successively on diamond paste caps and finally with a microcloth saturated with a 0.3 percent suspension of alumina in water). The anisotropic (mesophase) portion of the pitch appears white in color when examined under such conditions while the isotropic (non-mesophase) portion appears black. A photograph of a representative sample of the pitch is then made at a magnification sufficient to identify the isotropic phase, usually at or greater than 250×. The photograph can be used to determine the isotropic content of the sample by placing the picture in a light box, superimposing a piece of tracing paper thereon, and tracing the spherical black isotropic regions with a pencil. The paper is then subjected to an electronic scanning device that divides the picture area into a number of elements and accumulates the regions which have been outlined. The number of elements in these regions divided by the total number of elements in the area scanned represents the percent of the picture area which is isotropic.

After the desired mesophase pitch has been prepared, it is spun into continuous fibers by conventional techniques, e.g., by melt spinning or in any other known manner. In order to obtain highly oriented continuous fibers capable of being heat treated to produce carbon and graphite fibers having a high Young's modulus of elasticity and high tensile strength, the pitch must be composed of a bulk mesophase having large coalesced domains, i.e., domains of aligned molecules in excess of two hundred microns up to in excess of one thousand microns in size (determined by observation under polarized light). Pitches composed of stringy bulk mesophase, having small oriented domains, rather than large coalesced domains, are unsuitable for this purpose. The mesophase of such pitches has a high viscosity which undergoes only limited coalescense, insufficient to produce large coalesced domains having sizes in excess of two hundred microns. Instead, small oriented domains of mesophase agglomerate to produce clumps or stringy masses wherein the ultimate domain size does not exceed one hundred microns. Certain pitches, such as fluoranthene pitch, which are formed by very rapid polymerization, are of this type. Likewise, pitches composed of a bulk mesophase which is not homogeneous are unsuitable. The latter phenomenon is caused by the presence of infusible solids (which are either present in the original pitch or which develop on heating) which are enveloped by the coalescing mesophase and serve to interrupt the homogeneity and uniformity of the coalesced domains, and the boundaries between them. Thus, pitches having a high fusible non-mesophase insoluble content in organic solvents such as pyridine, or those which develop a high infusible non-mesophase insoluble content when heated, should not be employed as starting materials because these pitches are incapable of developing the homogeneous bulk mesophase necessary to produce highly oriented continuous fibers capable of being converted by heat treatment into carbon fibers having a high Young's modulus of elasticity and high tensile strength. For this reason, pitches having an infusible pyridine-insoluble content of more than about 2 percent by weight should not be employed, or should be filtered to remove this material before being heated to produce mesophase. Preferably, such pitches are filtered when they contain more than about 1 percent by weight of such infusible, insoluble material. Most petroleum pitches and synthetic pitches have a low infusible, insoluble content and can be used directly without such filtration. Most coal tar pitches, on the other hand, have a high infusible, insoluble content and require filtration before they can be employed.

Another requirement for spinning the essentially 100 percent mesophase pitches of the present invention into continuous filaments is that they be non-thixotropic under the conditions employed in the spinning, i.e., they must exhibit a Newtonian or plastic flow behavior so that their flow is uniform and well behaved. When such pitches are heated to a temperature where they exhibit a viscosity of from about 10 poises to about 200 poises, continuous uniform fibers may be readily spun therefrom. Pitches, on the other hand, which do not exhibit Newtonian or plastic flow behavior at the temperature of spinning, do not permit continuous uniform fibers to be spun therefrom.

The temperature at which the pitch is spun depends, of course, upon the temperature at which the pitch exhibits a suitable viscosity. Generally, at temperatures of from about 340° C. to about 380° C. the pitches of the present invention can be readily spun into continuous fibers having diameters of from about 5 microns to about 12 microns at a rate of from about 50 feet per minute to about 300 feet per minute.

The carbonaceous fibers produced in this manner are highly oriented graphitizable materials having a high degree of preferred orientation of their molecules parallel to the fiber axis. By "graphitizable" is meant that these fibers are capable of being converted thermally (usually by heating to a temperature in excess of about 2500° C., e.g., from about 2500° C. to about 3000° C.) to a structure having the three-dimensional order characteristic of polycrystalline graphite.

The fibers produced in this manner, of course, have the same chemical composition as the pitch from which they were drawn, and like such pitch consist of essentially 100 percent mesophase. When examined under magnification by polarized light microscopy techniques, the fibers are essentially completely anisotropic and consist of highly oriented elongated domains which are preferentially aligned parallel to the fiber axis. Characteristically, the oriented elongated domains have diameters in excess of 5000 Å, generally from about 10,000 Å to about 40,000 Å, and because of their large size are easily observed when examined by conventional polarized light microscopy techniques at a magnification of 1000. (The maximum resolving power of a standard polarized light microscope having a magnification factor of 1000 is only a few tenths of a micron [1 micron = 10,000 Å] and anisotropic domains having dimensions of 1000 Å or less cannot be detected by this technique.)

Because of the thermoplastic nature of the carbonaceous fibers produced from the pitches of the present invention, it is necessary to thermoset these fibers before they can be carbonized. Thermosetting of the fibers is readily effected by heating the fibers in an oxygen-containing atmosphere for a time sufficient to render them infusible. The oxygen-containing atmosphere employed may be pure oxygen or an oxygen-rich atmosphere. Most conveniently, air is employed as the oxidizing atmosphere. If desired, the fibers may be treated first in chlorine water in order to shorten the time required to thermoset them.

The time required to effect thermosetting of the fibers will, of course, vary with such factors as the particular oxidizing atmosphere, the temperature employed, the diameter of the fibers, and the particular pitch from which the fibers are prepared. Generally, however, thermosetting of the fibers can be effected in relatively short periods of time, usually in from about 5 minutes to about 60 minutes. Somewhat lesser times are required if the fibers are first treated in chlorine water.

The temperature employed to effect thermosetting of the fibers must, of course, not exceed the temperature at which the fibers will soften or distort. The maximum temperature which can be employed will thus depend upon the particular pitch from which the fibers were spun, and the moldcular weight distribution of such pitch. The higher the average molecular weight of the pitch, the higher will be its softening temperature, and the higher the temperature which can be employed to effect thermosetting of the fibers. At higher temperatures, of course, fibers of a given diameter can be thermoset in less time than is possible at lower temperatures. Fibers prepared from a pitch having a lower average molecular weight on the other hand, require relatively longer heat treatment at somewhat lower temperatures to render them infusible.

A minimum temperature of at least 250° C. is generally necessary to effectively thermoset the carbonaceous fibers produced from the pitches of the present invention. Temperatures in excess of 400° C. may cause melting and/or excessive burn-off of the fibers and should be avoided. Preferably, temperatures of from about 275° C. to about 350° C. are employed. At such temperatures, thermosetting can generally be effected within from about 5 minutes to about 60 minutes.

After the fibers have been thermoset, the infusible fibers are carbonized by heating in an inert atmosphere, such as that described above, to a temperature sufficiently elevated to remove hydrogen and other carbonization by-products and produce a substantially all-carbon fiber. Fibers having a carbon content greater than about 98 percent by weight can generally be produced by heating to a temperature in excess of about 1000° C., and at temperatures in excess of about 1500° C., the fibers are completely carbonized.

Usually, carbonization is effected at a temperature of from about 1000° C. to about 2000° C., preferably from about 1500° C. to about 1900° C. Generally, residence times of from about 0.5 minute to about 25 minutes, preferably from about 1 minute to about 5 minutes, are employed. While more extended heating times can be employed with good results, such residence times are uneconomical and, as a practical matter, there is no advantage in employing such long periods.

In order to ensure that the rate of weight loss of the fibers does not become so excessive as to disrupt the fiber structure, it is preferred to heat the fibers for a brief period at a temperature of from about 700° C. to about 900° C. before they are heated to their final carbonization temperature. Residence times at these temperatures of from about 30 seconds to about 5 minutes are usually sufficient. Preferably, the fibers are heated at a temperature of about 700° C. for about one-half minute and then at a temperature of about 900° C. for like time. In any event, the heating rate must be controlled so that the volatization does not proceed at an excessive rate.

In a preferred method of heat treatment, the fibers are continuously passed through a series of heating zones which are held at successively higher temperatures. If desired, the first of such zones may contain an oxidizing atmosphere where thermosetting of the fibers is effected. Several arrangements of apparatus can be utilized in providing the series of heating zones. Thus, one furnace can be used with the fibers being passed through the furnace several times and with the temperature being increased each time. Alternatively, the fibers may be given a single pass through several furnaces, with each successive furnace being maintained at a higher temperature than that of the previous furnace. Also, a single furnace with several heating zones maintained at successively higher temperatures in the direction of travel of the fibers can be used.

The carbon fibers produced in this manner have a highly oriented structure characterized by the presence of carbon crystallites preferentially aligned parallel to the fiber axis, and are graphitizable materials which when heated to graphitizing temperatures develop the three-dimensional order characteristic of polycrystalline graphite and graphitic-like properties associated therewith, such as high density and low electrical resistivity.

If desired, the carbonized fibers may be further heated in an inert atmosphere, as described hereinbefore, to a still higher temperature in a range of from about 2500° C. to about 3300° C. preferably from about 2800° C. to about 3000° C., to produce fibers having not only a high degree of preferred orientation of their carbon crystallites parallel to the fiber axis, but also a structure characteristic of polycrystalline graphite. A residence time of about 1 minute is satisfactory, although both shorter and longer times may be employed, e.g., from about 10 seconds to about 5 minutes, or longer. Residence times longer than 5 minutes are uneconomical and unnecessary, but may be employed if desired.

The fibers produced by heating at a temperature above about 2500° C., preferably above about 2800° C., are characterized as having the three-dimensional order of polycrystalline graphite. This three-dimensional order is established by the X-ray diffraction pattern of the fibers, specifically by the presence of the (112) cross-lattice line and the resolution of the (10) band into two distinct lines, (100) and (101). The short arcs which constitute the (00l) bands of the pattern show the carbon crystallites of the fibers to be preferentially aligned parallel to the fiber axis. Microdensitometer scanning of the (002) band of the exposed X-ray film indicates this preferred orientation to be no more than about 10°, usually from about 5° to about 10° (expressed as the full width at half maximum of the azimuthal intensity distribution). The interlayer spacing (d) of the crystallites, calculated from the distance between the corresponding (00l) diffraction arcs, is no more than 3.37 Å, usually from 3.36 Å to 3.37 Å.

The following example is set forth for purposes of illustration so that those skilled in the art may better understand the invention. It should be understood that it is exemplary only and should not be construed as limiting the invention in any manner. Tensile strength, Young's modulus, Mettler softening point, and all viscosity and flow properties referred to in the example and throughout the specification were determined as described below unless otherwise specified.

TENSILE STRENGTH AND YOUNG'S MODULUS

Tensile strength and Young's modulus were determined on an Instron testing machine at a cross-head speed of 0.02 cm./min. Short gauge tensile strength measurements were made on filaments 3.2 mm. long and long gauge tensile strength measurements were made on filaments 20 mm. long. Young's modulus was also measured on 20 mm. long filaments.

METTLER SOFTENING POINT

Mettler softening point was measured by means of a Mettler Softening Point Apparatus having a modified temperature control so that it could be used a temperatures up to 390° C. The pitch was rapidly heated in an inert atmosphere to about 10°–20° C. below its melting point and then at a rate of 2° C. per minute until the softening point was reached.

VISCOSITY MEASUREMENTS AND FLOW PROPERTIES

Viscosity and flow properties of the pitches of the present invention were determined with a Haake Rotovisco RV-3 viscometer. The viscometer was equipped with a cylindrical bob, 20 mm. in diameter, which was positioned to rotate in a cup 22 mm. in diameter at speeds up to 300 rpm.

A small sample of pitch was placed in the annular space between the cup and the bob and melted. The pitch was kept under an inert atmosphere and the temperature was raised at a rate of 0.6° C. per minute from somewhat above the Mettler softening point of the pitch to up to 425° C. At 10–15 minute intervals, a flow curve was prepared by measuring the torque required to steadily increase the revolutions of the bob from 0 revolutions per minute to the number of revolutions per minute at which the torque approaches 500 g.-cm., and then back to 0 revolutions per minute at the same rate. The data obtained was converted to viscosity through the use of a calibration curve obtained with silicone fluids of known viscosity. It is noted that the complete cycle from 0 revolutions per minute to the number of revolutions per minute at which the torque approaches 500 g.-cm. and back to 0 revolutions per minute takes only 2 minutes or less, so that the maximum change in pitch temperature is only 1.2° C. and the effect on the viscosity curve resulting from this change in temperature is negligible.

Measurements were made at temperatures inclusive of viscosities of 100–200 poises so as to evaluate the materials for spinnability. Because of equipment limitations, no measurements could be made at shear rates above 500 sec.$^{-1}$.

If the torque value of a sample is the same at a certain rpm., regardless of whether that rpm. has been achieved by increasing or decreasing the revolution speed, the pitch is described as having "reversible" flow, or as being "nonthixotropic". Oftentimes, however, the torque is less during the decreasing rpm. portion of the cycle, which indicates that the pitch has been changed in some way by the shearing action applied during the first part of the cycle. The pitch is then described as "thixotropic", since there is a hysteresis in its flow curve.

Pitches were rated as "excellent" in flow properties if they exhibited no hysteresis even at shear rates of 500 sec.$^{-1}$. A pitch which exhibited a small amount of hysteresis in its flow curves was rated as "good" in flow properties, while a pitch with larger hysteresis was judged "fair" provided torque measurements continued to respond to changes in the rate of revolution of the bob and did not become independent thereof. If torque measurements became independent of the rate of revolution of the bob at shear rates of 100 sec.$^{-1}$ or less, the pitch was adjudged "poor" in flow properties.

EXAMPLE 1

A commercial petroleum pitch was employed to produce an essentially 100 percent mesophase pitch. The precursor pitch had a number average molecular weight of 400, a density of 1.2 grams/cc., a Mettler softening temperature of 123° C., and contained 0.5 percent by weight pyridine insolubles (P.I. was determined by Soxhlet extraction in boiling pyridine (115° C.)). Chemical analysis showed a carbon content of 92.8%, a hydrogen content of 5.6%, a sulfur content of 1.33%, and 0.013% ash.

The precursor pitch was filtered through a fiberglass filter to remove any solid material present, and 240 grams of the filtered pitch were then converted to mesophase pitch by heating in a 350 cc. reactor to a temperature of 380° C. over a one hour period, and maintaining the pitch at this temperature for an additional 44 hours. The pitch was continuously stirred after it had been heated to 210° C. by means of a stirrer rotating at 300 rpm. so as to produce a homogeneous emulsion of the mesophase and non-mesophase portions of the pitch. Argon gas was continuously bubbled through the pitch throughout the 44 hour period at a rate of 4.0 scfh. per pound of pitch while an additional flow of about 2.7 scfh. of argon was passed through the dome of the reactor. Heating was continued until the pitch had been essentially completely converted to mesophase and the emulsion has been transformed into an essentially single phase system. Stirring was continued throughout this period and during the cooldown of the pitch.

The mesophase pitch was recovered in a yield of 47.4 weight percent. The recovered pitch had a number average molecular weight of 871, a density of 1.3 grams/cc., a Mettler softening temperature of 341° C., and contained 51 percent by weight pyridine insolubles. Fifty-five percent (55%) of the molecules in the pitch had a molecular weight of less than 800 and only four percent (4%) of the molecules in the pitch had a molecular weight in excess of 1500.

The pitch had a viscosity of 130 poises at 380° C. and exhibited excellent flow properties at all temperatures from 357° C. to 425° C., i.e., it was non-thixotropic at such temperatures and exhibited no hysteresis even at shear rates of 500 sec.$^{-1}$.

The mesophase content of the pitch was determined by polarized light microscopy. One and one-half grams (1.5 g.) of the pitch was annealed at a temperature of 350° C. for one-half hour in a nitrogen atmosphere. A cross-section of the annealed pitch was then encapsulated in an epoxy resin and examined under polarized light using cross polarizers (after fine grinding the samples on silicon carbide laps and then polishing them successively on diamond paste laps and finally with a microcloth saturated with a 0.3 percent suspension of alumina in water). A photograph of a representative portion of the pitch was taken at a magnification of 250 X. In excess of 99 percent of the sample was anisotropic, i.e., the pitch was essentially 100 percent mesophase.

The pitch produced in this manner was easily and continuously spun through a spinnerette having a single orifice 13 microns in diameter and 26 microns in length at a temperature of 372° C. to produce a continuous monofilament having a diameter of about 8 microns. A nitrogen atmosphere was employed throughout the spinning operation.

A portion of the fiber produced in this manner was immersed in a saturated solution of chlorine water at room temperature for 1.5 minutes and then heated in oxygen for two minutes at a temperature of 300° C. The resulting fiber was totally infusible and could be heated at elevated temperatures without sagging.

The infusible fiber was heated to a temperature of 925° C. at a rate of 10° C./minute an a nitrogen atmosphere, and then heated at 1650° C. for an additional 5 minutes. The resulting fiber had a Young's modulus of 303 GPa ($44 \times 10^6$ psi.), a long gauge tensile strength of $2.28 \times 10^3$ GPa ($330 \times 10^3$ psi.) and a short gauge tensile strength of $2.33 \times 10^3$ GPa ($340 \times 10^3$ psi.). (Tensile strength and Young's modulus are the average of 4 samples.).

Essentially 100 percent mesophase pitches similar to the pitch described herein can be prepared in similar manner by heating for 24 hours at a temperature of 390° C. using an inert gas flow rate of 5.2 scfh. per pound of pitch, or by heating for 5 hours at 420° C. using an inert gas flow rate of 8.0 scfh. per pound of pitch.

What is claimed is:

1. A single phase essentially completely anisotropic pitch consisting of essentially 100 percent mesophase and suitable for spinning into continuous filaments, said pitch having a number average molecular weight below 1000, a net pyridine insoluble content no greater than 60 percent by weight, a softening temperature no greater than 350° C., and a viscosity no greater than 200 poises at 380° C.

2. A single phase essentially completely anisotropic pitch as in claim 1 having a number average molecular weight of from about 800 to about 900, a net pyridine insoluble content of from 50 percent by weight to 60 percent by weight, a softening temperature of from 330° C. to 350° C., and a viscosity of from about 50 poises to about 150 poises at 380° C.

3. A process for producing a single phase essentially completely anisotropic pitch consisting of essentially 100 percent mesophase and suitable for spinning into continuous filaments, said pitch having a number average molecular weight below 1000, a net pyridine insoluble content no greater than 60 percent by weight, a softening temperature no greater than 350° C., and a viscosity no greater than 200 poises at 380° C., which comprises passing an inert gas through an isotropic carbonaceous pitch while heating the pitch at a temperature of from about 380° C. to about 430° C. to produce mesophase and simultaneously agitating the pitch so as to produce a homogeneous emulsion of the mesophase produced and the remaining non-mesophase portion of the pitch, said inert gas being passed through the pitch at a rate sufficient to ensure essentially complete removal of the volatile low molecular weight components of the pitch which do not form mesophase at a rate sufficiently rapid to allow formation of said single phase essentially completely anisotropic pitch, said rate being at least 4.0 scfh. per pound of pitch, and said heating and agitation being continued until the pitch has been essentially completely converted to mesophase and the emulsion has been transformed into an essentially single phase system.

4. A process as in claim 3 wherein the inert gas is passed through the pitch at a rate of from 4.0 scfh. to 10.0 scfh. per pound of pitch.

5. A continuous carbonaceous pitch fiber spun from a single phase essentially completely anisotropic pitch consisting of essentially 100 percent mesophase, said pitch having a number average molecular weight below 1000, a net pyridine insoluble content no greater than 60 percent by weight, a softening temperature no greater than 350° C., and a viscosity no greater than 200 poises at 380° C.

6. A continuous carbonaceous pitch fiber as in claim 5 spun from a single phase essentially completely anisotropic pitch having a number average molecular weight of from about 800 to about 900, a net pyridine insoluble content of from 50 percent by weight to 60 percent by weight, a softening temperature of from 330° C. to 350° C., and a viscosity of from about 50 poises to about 150 poises at 380° C.

7. In a process for producing continuous carbon fiber which comprises spinning a carbonaceous fiber from a nonthixotropic carbonaceous pitch which under quiescent conditions forms a homogeneous bulk mesophase having large coalesced domains; heating the spun fiber in an oxygen-containing atmosphere for a time sufficient to render it infusible; and carbonizing the infusible fiber so produced by heating in an inert atmosphere; the improvement which comprises spinning the carbonaceous fiber from a single phase essentially completely anisotropic pitch consisting of essentially 100 percent mesophase, said pitch having a number of average molecular weight below 1000, a net pyridine insoluble content no greater than 60 percent by weight, a softening temperature no greater than 350° C., and a viscosity no greater than 200 poises at 380° C.

8. A process as in claim 7 wherein the carbonaceous fiber is spun from a single phase essentially completely anisotropic pitch having a number average molecular weight of from about 800 to about 900, a net pyridine insoluble content of from 50 percent by weight to 60 percent by weight, a softening temperature of from 330° C. to 350° C., and a viscosity of from about 50 poises to about 150 poises.

* * * * *

UNITED STATES PATENT AND TRADEMARK OFFICE
CERTIFICATE OF CORRECTION

PATENT NO. : 4,209,500
DATED : June 24, 1980
INVENTOR(S) : Stephen Chwastiak

It is certified that error appears in the above—identified patent and that said Letters Patent is hereby corrected as shown below:

Col. 2, line 17, change "then" to --than--;

Col. 4, line 1, change "form" to --from--;

Col. 7, line 10, change "polmerization" to --polymerization--

Col. 10, line 65, change "fusible" to --infusible--;

Col. 13, line 56, change "(001)" to --(00ℓ)--;

Col. 16, line 10, change "microns" to --mils-- (each occurrence).

Signed and Sealed this

Twelfth Day of January 1982

[SEAL]

Attest:

GERALD J. MOSSINGHOFF

Attesting Officer     Commissioner of Patents and Trademarks